(12) United States Patent
Yoshioka et al.

(10) Patent No.: US 11,996,946 B2
(45) Date of Patent: May 28, 2024

(54) COMMUNICATION APPARATUS AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 334 days.

(21) Appl. No.: 17/598,542

(22) PCT Filed: Apr. 2, 2019

(86) PCT No.: PCT/JP2019/014712
§ 371 (c)(1),
(2) Date: Sep. 27, 2021

(87) PCT Pub. No.: WO2020/202484
PCT Pub. Date: Oct. 8, 2020

(65) Prior Publication Data
US 2022/0173839 A1 Jun. 2, 2022

(51) Int. Cl.
*H04L 1/1812* (2023.01)
*H04W 4/06* (2009.01)
*H04W 92/18* (2009.01)
*H04W 4/40* (2018.01)

(52) U.S. Cl.
CPC .......... *H04L 1/1812* (2013.01); *H04W 4/06* (2013.01); *H04W 4/40* (2018.02); *H04W 92/18* (2013.01)

(58) Field of Classification Search
CPC ... H04L 1/1812; H04L 1/1822; H04L 1/1896; H04L 2001/0093; H04L 2001/0092; H04W 4/06; H04W 4/40; H04W 92/18; H04W 84/005
See application file for complete search history.

(56) References Cited

U.S. PATENT DOCUMENTS

2014/0334392 A1* 11/2014 Gage ..................... H04L 5/0092
370/329
2020/0228247 A1* 7/2020 Guo ..................... H04W 52/383

OTHER PUBLICATIONS

Lenovo, Motorola Mobility, "SL HARQ operation", Mar. 2019, 3GPP TSG RAN WG2 Meeting #105bis, R2-1904159, pp. 1-4, (Year: 2019).*
3GPP TSG RAN WG2 Meeting #105bis; R2-1904159 "SL HARQ operation" Lenovo, Motorola Mobility; Xi'an, China; Apr. 8-12, 2019 (4 pages).
3GPP TSG RAN WG1 Meeting #96; R1-1901993 "Discussion on physical layer procedures in NR V2X" CATT; Athens, Greece; Feb. 25-Mar. 1, 2019 (9 pages).

(Continued)

*Primary Examiner* — Farid Seyedvosoghi
(74) *Attorney, Agent, or Firm* — Osha Bergman Watanabe & Burton LLP

(57) ABSTRACT

A communication apparatus includes a control unit that separately defines, for unicast and for groupcast, a Hybrid Automatic Repeat Request (HARQ) process number and a New Data Indicator (NDI) used for sidelink HARQ processing; and a transmitting unit that transmits sidelink control information including the HARQ process number and the NDI defined for the unicast, or including the HARQ process number and the NDI defined for the groupcast.

6 Claims, 20 Drawing Sheets

(56) References Cited

OTHER PUBLICATIONS

3GPP TSG-RAN WG2 Meeting #105bis; R2-1905038 "Sidelink HARQ operation for NR V2X" ITL; Xian, China; Apr. 8-12, 2019 (2 pages).
3GPP TSG RAN WG1 Meeting #95; R1-1813075 "Consideration on physical layer procedures" Spreadtrum Communications; Spokane, USA; Nov. 12-16, 2018 (5 pages).
Extended European Search Report issued in European Application No. 19923438.6, dated Oct. 18, 2022 (12 pages).
International Search Report issued in PCT/JP2019/014712 dated Jun. 11, 2019 (5 page).
Written Opinion of the International Searching Authority issued in PCT/JP2019/014712 dated Jun. 11, 2019 (6 pages).
InterDigital Inc.; "On Physical Layer Procedures"; 3GPP TSG RAN WG1 Meeting #95, R1-1813227; Spokane, USA; Nov. 12-16, 2018 (4 pages).
3GPP TS 38.213 V15.4.0; "3rd Generation Partnership Project; Technical Specification Group Radio Access Network; NR; Physical layer procedures for control (Release 15)" Dec. 2018 (104 pages).
Office Action in the counterpart Chinese Application No. 201980094626.4, dated May 27, 2023 (18 pages).

\* cited by examiner

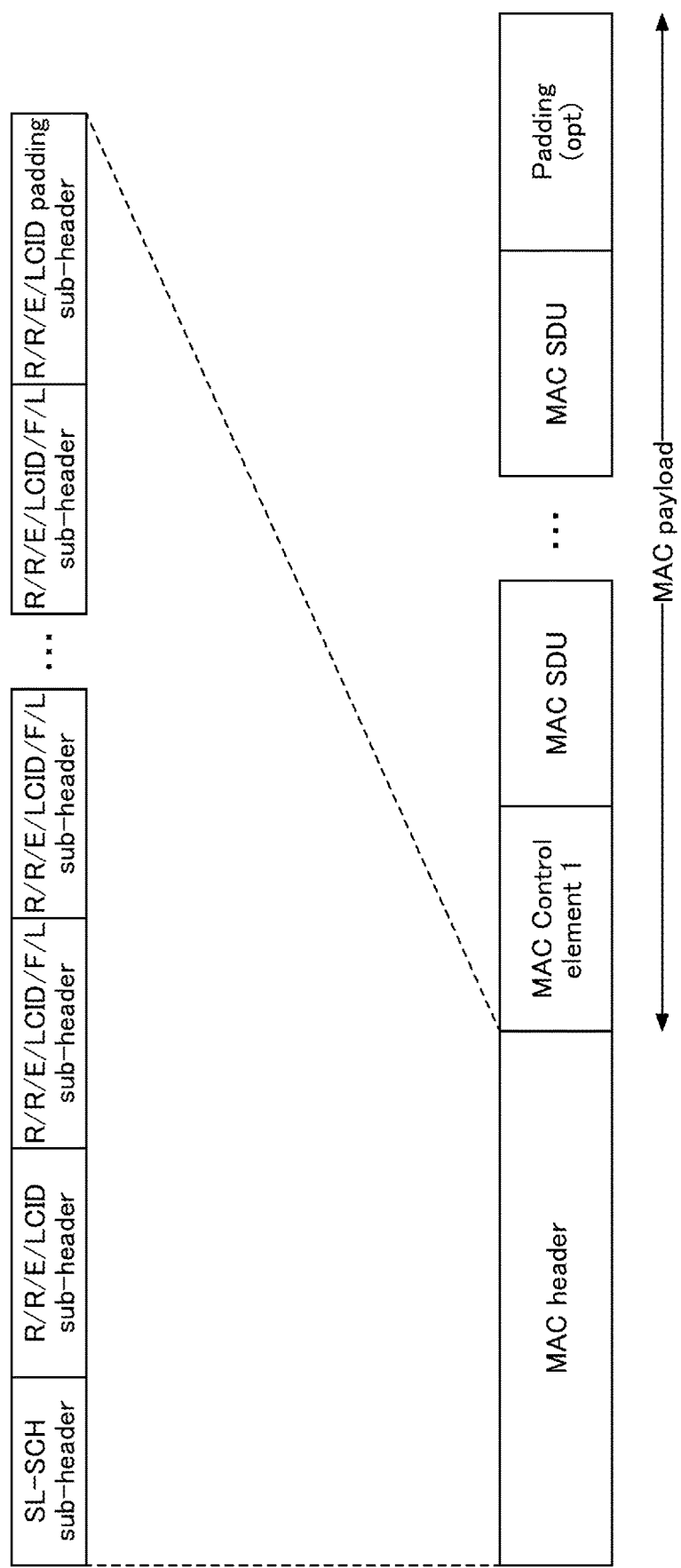

FIG.15

| HARQ process for Unicast: | HPN#1 | HPN#2 | HPN#3 | HPN#4 | HPN#5 | HPN#6 | HPN#7 | HPN#8 |
|---|---|---|---|---|---|---|---|---|
| HARQ process for groupcast: | HPN#1 | HPN#2 | HPN#3 | HPN#4 | HPN#5 | HPN#6 | HPN#7 | HPN#8 |

FIG.17

HARQ process for Unicast TX UE→RX#1:
| HPN#1 | HPN#2 | HPN#3 | HPN#4 | HPN#5 | HPN#6 | HPN#7 | HPN#8 |

HARQ process for Unicast TX UE→RX#2:
| HPN#1 | HPN#2 | HPN#3 | HPN#4 | HPN#5 | HPN#6 | HPN#7 | HPN#8 |

HARQ process for Unicast TX UE→RX#ZZZ:
| HPN#1 | HPN#2 | HPN#3 | HPN#4 | HPN#5 | HPN#6 | HPN#7 | HPN#8 |

HARQ process for groupcast TX UE→Group#1:
| HPN#1 | HPN#2 | HPN#3 | HPN#4 | HPN#5 | HPN#6 | HPN#7 | HPN#8 |

HARQ process for groupcast TX UE→Group#ZZZ:
| HPN#1 | HPN#2 | HPN#3 | HPN#4 | HPN#5 | HPN#6 | HPN#7 | HPN#8 |

COMMUNICATION APPARATUS AND COMMUNICATION METHOD

TECHNICAL FIELD

The present invention relates to a communication apparatus and a communication method in a radio communication system.

BACKGROUND ART

In Long Term Evolution (LTE), successor systems of LTE (for example, LTE Advanced (LTE-A), and New Radio (NR) (also called 5G)), technology of sidelink (device to device (D2D)) has been studied in which communication apparatuses, such as a user equipment (UE), perform communication directly with each other without going through a base station (Non-Patent Document 1).

Furthermore, implementation of vehicle to everything (V2X) has been studied, and a specification has been developed. Here, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to nomadic device (V2N) meaning a communication mode performed between a vehicle and a mobile terminal of a driver, and vehicle to pedestrian (V2P) meaning a communication mode performed between a vehicle and a mobile terminal of a pedestrian as illustrated in FIG. 1.

RELATED ART DOCUMENT

Non-Patent Document

Non-Patent Document 1: 3GPP TS 38.213 V15.4.0 (2018-12)

SUMMARY OF THE INVENTION

Problem to be Solved by the Invention

For NR-V2X unicast and groupcast, hybrid automatic repeat request (HARQ) feedback is supported. For a HARQ process of NR-Uu (an interface between user equipment and base station), a HARQ process number (HPN: HARQ process number) and a new data indicator (NDI) are used. The HPN and the NDI are also assumed to be used in NR-V2X.

There is a need for defining an HPN and an NDI used in NR-V2X so that an appropriate effect of sidelink HARQ processing can be obtained.

Means for Solving the Problem

According to an aspect of the present invention, there is provided a communication apparatus including a control unit that separately defines, for unicast and for groupcast, a Hybrid Automatic Repeat Request (HARQ) process number and a New Data Indicator (NDI) used for sidelink HARQ processing; and a transmitting unit that transmits sidelink control information including the HARQ process number and the NDI defined for the unicast, or including the HARQ process number and the NDI defined for the groupcast.

Advantage of the Invention

According to an embodiment, an HPN and an NDI can be defined so that an appropriate effect of sidelink HARQ processing can be obtained.

BRIEF DESCRIPTION OF DRAWINGS

FIG. 3 is a diagram for illustrating a MAC PDU used for sidelink communication.
FIG. 8B is a diagram illustrating an outline of SL transmission mode 2a.
FIG. 15 is a diagram illustrating an example in which HPN and NDI are separately defined for unicast and groupcast.
FIG. 17 is a diagram illustrating an example in which HPN and NDI are defined per link.

EMBODIMENTS OF THE INVENTION

In the following, embodiments of the present invention are described with reference to the appended drawings. The embodiments described below are merely an example, and embodiments to which the present invention is applied are not limited to the following embodiments.

In the embodiments, it is assumed that a direct communication scheme between communication apparatuses is LTE sidelink (SL) or NR SL, but the direct communication method is not limited to this method. Furthermore, the name "sidelink" is an example, and uplink (UL) may include a function of SL without using the name "sidelink." The SL may be distinguished from downlink (DL) or UL by a difference in a frequency or time resource or may be another name.

Furthermore, UL and SL may be distinguished by a difference of one or more combinations of a time resource, a frequency resource, a time/frequency resource, a reference signal to be referred to so as to determine a path loss in transmission power control, and a reference signals (PSS/SSS/PSSS/SSSS) used for synchronization.

For example, in UL, a reference signal of an antenna port X is used as the reference signal to be referred to so as to determine the path loss in the transmission power control, and in SL (including UL used as SL), a reference signal of an antenna port Y is used as the reference signal to be referred to so as to determine the path loss in the transmission power control.

Furthermore, in the embodiments, a configuration in which a communication apparatus is installed in a vehicle is mainly assumed, but an embodiment of the present invention is not limited to this configuration. For example, a communication apparatus may be a terminal carried by a person, a communication apparatus may be a drone or a device installed in an aircraft, and a communication apparatus may be a base station, an RSU, a relay station (relay node), a user equipment provided with scheduling capability, or the like.

(Overview of Sidelink)

In the embodiment, since sidelink is a basic technique used here, first, an overview of sidelink is described as a basic example. An example of a technique described here is a technique specified in Rel. 14 of 3GPP or the like. This technique may be used in NR, or a technique different from this technique may be used in NR. A sidelink communication may be defined to be a direct communication performed among two or more neighboring units of user equipment by using E-UTRA technology, without going through a network node. A sidelink may be defined to be an interface between units of user equipment in a sidelink communication.

Figure 1:
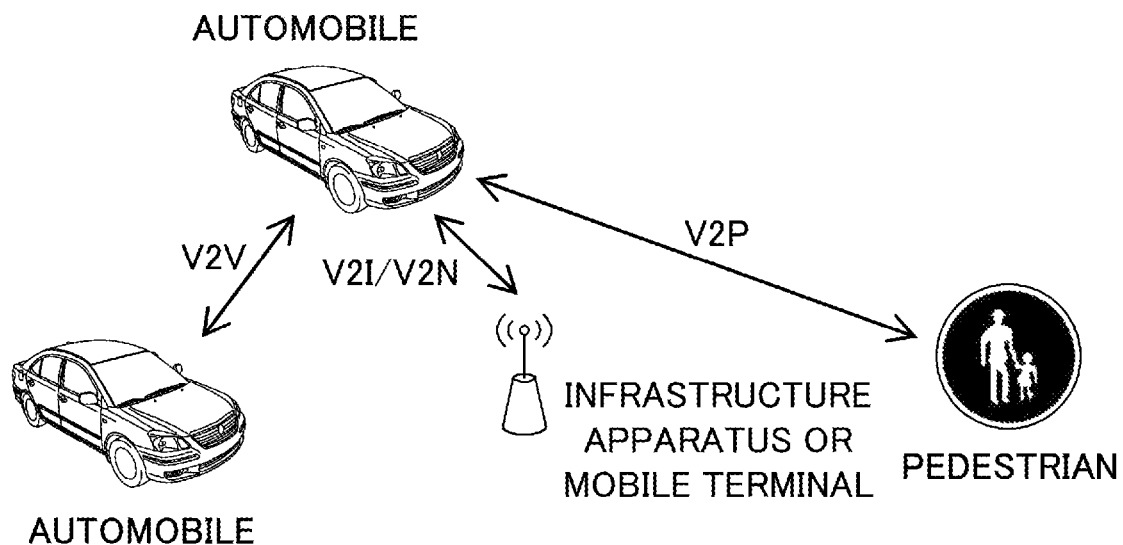
FIG. 1 is a diagram for illustrating V2X.
Figure 2A:
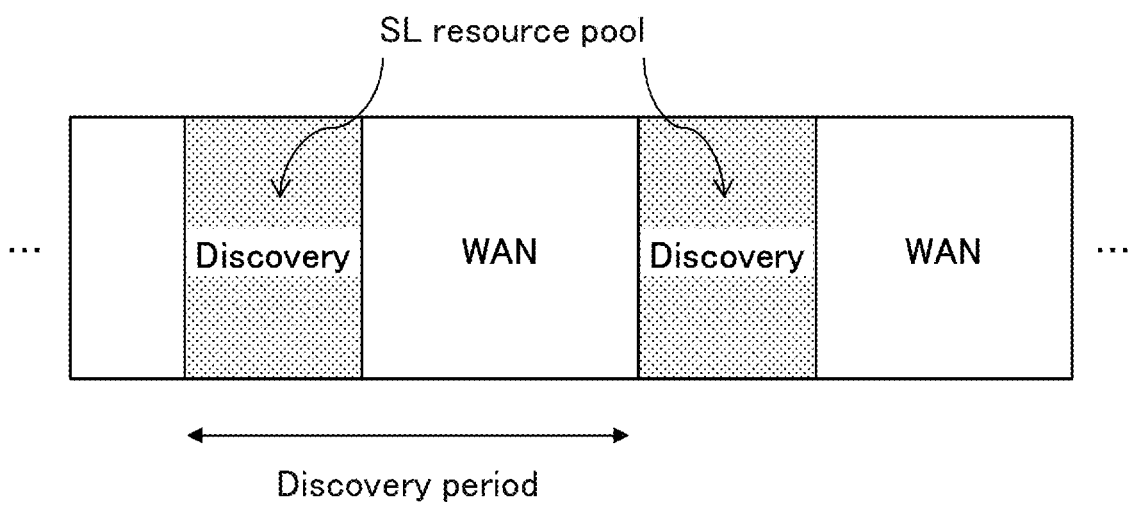
FIG. 2A is a diagram for illustrating sidelink.

Sidelink is roughly divided into "discovery" and "communication." For "discovery," as illustrated in FIG. 2A, a discovery message resource pool is configured for each discovery period, and a communication apparatus (referred to as a UE) transmits a discovery message (discovery signal) within the resource pool. More specifically, there are Type 1 and Type 2b. In Type 1, a communication apparatus autonomously selects a transmission resource from the resource pool. In Type 2b, a quasi-static resource is allocated by higher layer signaling (for example, an RRC signal).

Figure 2B:
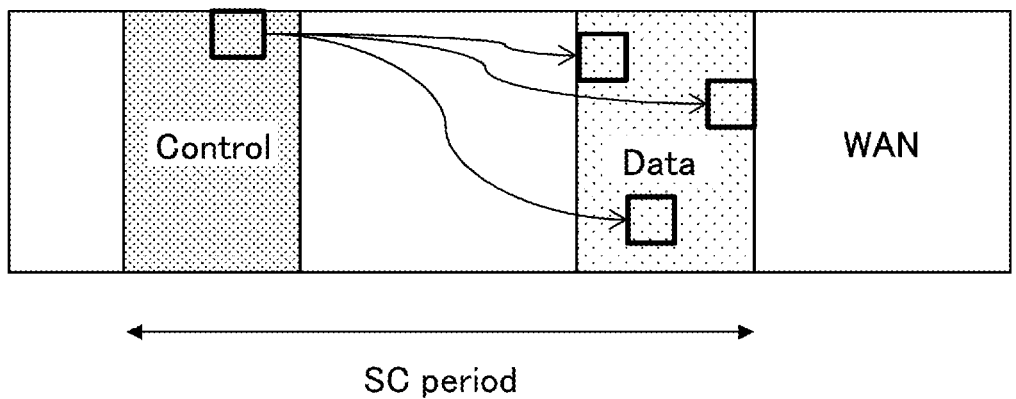
FIG. 2B is a diagram for illustrating sidelink.

For "communication," as illustrated in FIG. 2B, a sidelink control information (SCI)/data transmission resource pool is periodically configured for each Sidelink Control (SC) period. A communication apparatus on a transmission side notifies a reception side of a data transmission resource (PSSCH resource pool) or the like through the SCI with the resource selected from the control resource pool (PSCCH resource pool), and transmits data with the data transmission resource. For "communication," in further detail, there are a mode 1 and a mode 2. In the mode 1, resources are dynamically allocated by an (enhanced) physical downlink control channel ((E) PDCCH) transmitted from a base station to a communication apparatus. In the mode 2, a communication apparatus autonomously selects a transmission resource from the resource pool. For example, the resource pool is provided by notification through SIB, for example, and is predefined.

In Rel-14, in addition to the mode 1 and the mode 2, there are a mode 3 and a mode 4. In Rel-14, SCI and data can be transmitted simultaneously (in one sub frame) with resource blocks that are adjacent in a frequency direction. The SCI is also referred to as scheduling assignment (SA).

A channel used for "discovery" is referred to as a physical sidelink discovery channel (PSDCH), a channel for transmitting control information such as the SCI in "communication" is referred to as a physical sidelink control channel (PSCCH), and a channel for transmitting data is referred to as a physical sidelink shared channel (PSSCH). The PSCCH and the PSSCH have a PUSCH-based structure and have a structure in which a demodulation reference signal (DMRS) is inserted.

As illustrated in FIG. 3, a medium access control (MAC) protocol data unit (PDU) used for sidelink includes at least a MAC header, a MAC control element, a MAC service data unit (SDU), and padding. The MAC PDU may include other information. The MAC header includes one a sidelink shared channel (SL-SCH) subheader and one or more MAC PDU subheaders.

Figure 4:
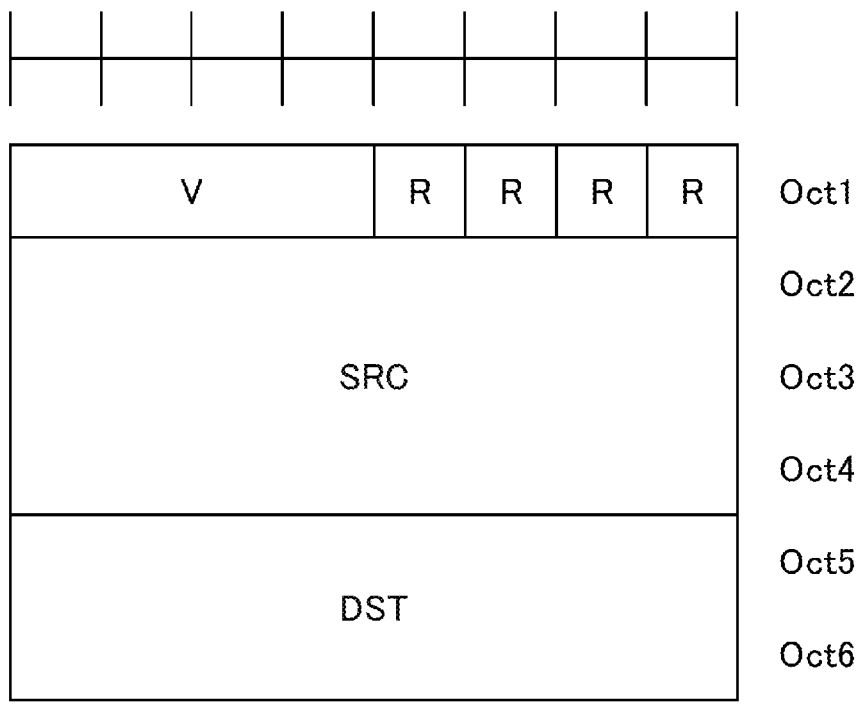
FIG. 4 is a diagram for illustrating a format of an SL-SCH subheader.

As illustrated in FIG. 4, the SL-SCH subheader includes a MAC PDU format version (V), transmission source information (SRC), transmission destination information (DST), reserved bits (R), and the like. V is allocated to the head of the SL-SCH subheader and indicates the MAC PDU format version used by the communication apparatus. Information related to a transmission source is configured in the transmission source information. An identifier related to a ProSe UE ID may be configured in the transmission source information. Information related to a transmission destination is configured in the transmission destination information. Information related to a ProSe Layer-2 Group ID of the transmission destination may be configured in the transmission destination information.

Figure 5:
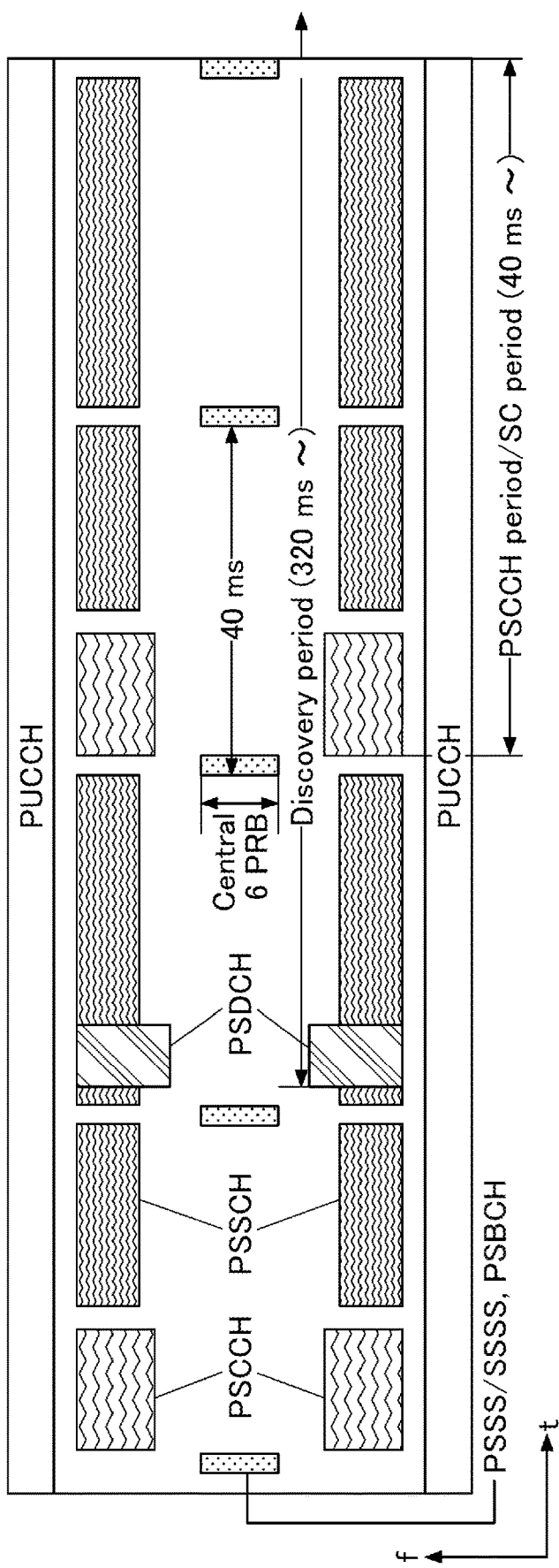
FIG. 5 is a diagram for illustrating an example of a channel structure used in LTE-V2X sidelink.

An example of a channel structure of LTE-V2X sidelink is illustrated in FIG. 5. As illustrated in FIG. 5, the resource pool of the PSCCH used for "communication" and the resource pool of the PSSCH are allocated. Furthermore, the resource pool of the PSDCH used for "discovery" is allocated at a period longer than a period of a channel of "communication." Note that the PSDCH need not be included for NR-V2X.

A Primary Sidelink Synchronization signal (PSSS) and a secondary sidelink synchronization signal (SSSS) are used as synchronization signals for sidelink. For example, a physical sidelink broadcast channel (PSBCH) for transmitting broadcast information such as a system band of sidelink, a frame number, and resource configuration information is used for an operation outside a coverage. The PSSS/SSSS and the PSBCH are transmitted, for example, in one sub frame. The PSSS/SSSS is also referred to as an SLSS.

V2X assumed in the embodiments is a method related to "communication." However, in the embodiments, there may be no distinction between "communication" and "discovery." Furthermore, the technology according to the embodiments may be applied in "discovery."

(System Configuration)

Figure 6:
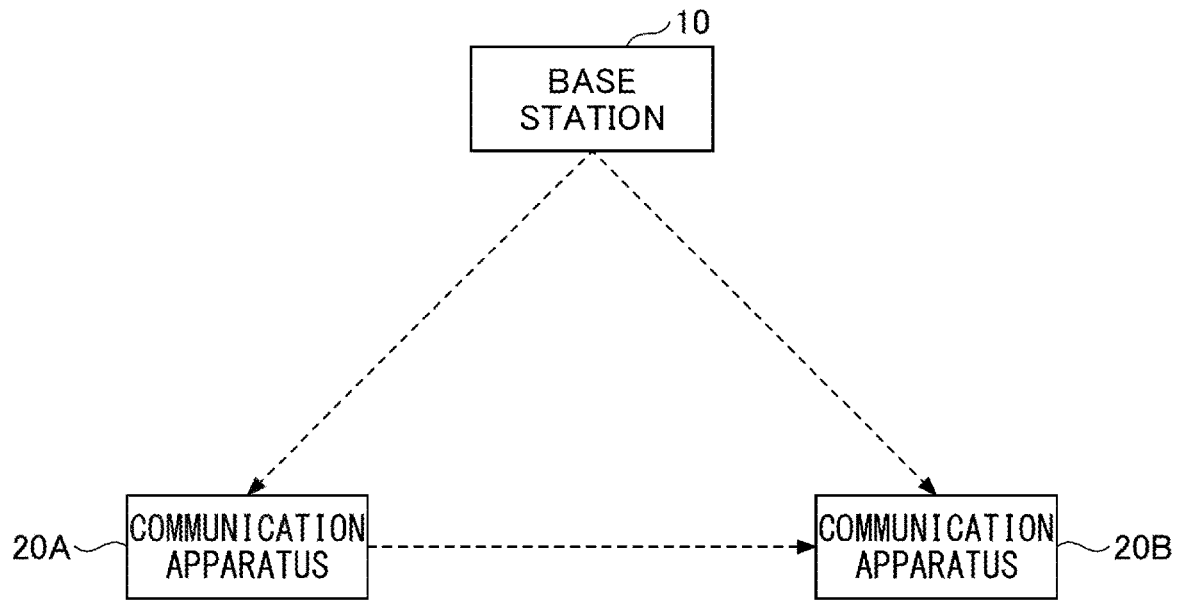
FIG. 6 is a diagram indicating an example of a configuration of a radio communication system according to an embodiment.

FIG. 6 is a diagram illustrating a configuration example of a radio communication system according to the embodiments. As illustrated in FIG. 6, the radio communication system according to the embodiments includes a base station 10, a communication apparatus 20A, and a communication apparatus 20B. Note that, actually, there may be many communication apparatuses, but FIG. 6 illustrates the communication apparatus 20A and the communication apparatus 20B as an example.

In FIG. 6, it is intended that the communication apparatus 20A is the transmission side, the communication apparatus 20B is the reception side, but both the communication apparatus 20A and the communication apparatus 20B have both the transmission function and the reception function. Hereinafter, when it is not necessary to particularly distinguish the communication apparatuses 20A and 20B, they are referred to simply as a "communication apparatus 20" or a "communication apparatus." FIG. 6 illustrates a case in which the communication apparatus 20A and the communication apparatus 20B are both in the coverage as an example, but an operation according to the embodiments can be applied to a case in which all the communication apparatuses 20 are within the coverage, a case in which some communication apparatuses 20 are within the coverage whereas the other communication apparatuses 20 are outside the coverage, and a case in which all the communication apparatuses 20 are outside the coverage.

In the embodiments, the communication apparatus 20 is a device installed in a vehicle such as, for example, an automobile and has a cellular communication function as a UE in LTE or NR and a sidelink function. Furthermore, the communication apparatus 20 has a function of acquiring report information (position, event information, or the like) as in a GPS device, a camera, or various types of sensors. Furthermore, the communication apparatus 20 may be a general mobile terminal (such as a smartphone). Furthermore, the communication apparatus 20 may be an RSU. The RSU may be a UE type RSU having a function of a UE, a BS type RSU (which is also referred to as a gNB type UE) having a function of a base station, or a relay station.

The communication apparatus 20 need not be a device of one housing, and for example, even when various types of sensors are distributed and arranged in a vehicle, a device including various types of sensors is the communication apparatus 20. Furthermore, the communication apparatus 20 may have a function of performing transmission and reception of data with various types of sensors without including various types of sensors.

Furthermore, processing of sidelink transmission of the communication apparatus 20 is basically the same as processing of UL transmission in LTE or NR. For example, the communication apparatus 20 scrambles and modulates codewords of transmission data, generates complex-valued symbols, maps the complex-valued symbols (transmission signals) to one or two layers, and performs precoding. Then, the precoded complex-valued symbols are mapped to resource elements, and a transmission signal (for example, CP-OFDM or a DFT-s-OFDM) is generated and transmitted from each antenna port.

The base station 10 has a cellular communication function as a base station 10 in LTE or NR and a function (for example, resource pool configuring, resource allocation, and the like) for enabling communication of the communication apparatus 20 in the embodiments. Furthermore, the base station 10 may be an RSU (a gNB type RSU), a relay station, or a communication apparatus provided with a scheduling function.

Furthermore, in the radio communication system according to the embodiments, a signal waveform used for SL or UL by the communication apparatus 20 may be an OFDMA, an SC-FDMA, or any other signal waveform. Furthermore, in the radio communication system according to the embodiments, as an example, a frame including a plurality of sub frames (for example, 10 sub frames) is formed in a time direction, and it includes a plurality of subcarriers in a frequency direction. One sub frame is an example of one transmission time interval (TTI). Here, the TTI is not necessarily a sub frame. For example, the TTI may be a slot, a mini-slot, or any other unit in the time domain. Furthermore, the number of slots per sub frame may be determined in accordance with the subcarrier spacing. Furthermore, the number of symbols per slot may be 14 symbols.

In the embodiments, the communication apparatus 20 can operate in any mode among a mode 1 which is a mode in which resources are dynamically allocated by the ((enhanced) physical downlink control channel ((E) PDCCH) transmitted from the base station 10 to the communication apparatus, a mode 2 which is a mode in which the communication apparatus autonomously selects a transmission resource from a resource pool, a mode in which resource for SL signal transmission is allocated from the base station 10 (hereinafter referred to as a mode 3), and a mode in which a resource for SL signal transmission is autonomously selected (hereinafter referred to as a mode 4). The mode is configured, for example, in the communication apparatus 20 from the base station 10.

Figure 7:
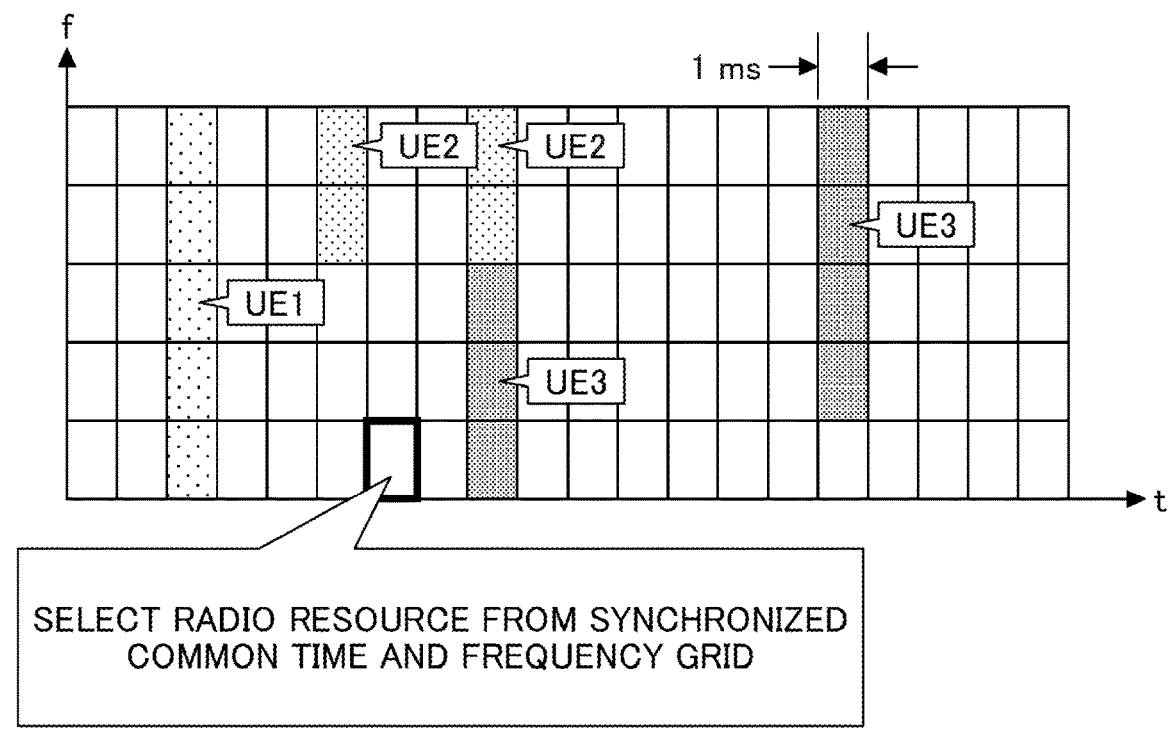
FIG. 7 is a diagram for illustrating a resource selection operation of a communication apparatus.

As illustrated in FIG. 7, the communication apparatus of the mode 4 (indicated by a UE in FIG. 7) selects a radio resource from a synchronized common time/frequency grid. For example, the communication apparatus 20 performs sensing in the background, specifies resources which have a good sensing result and are not reserved for other communication apparatuses as candidate resources, and selects a resource to be used for transmission from the candidate resources.

(Overview of NR V2X) In NR V2X, transmission modes are specified that are the same as SL transmission mode 3 and SL transmission mode 4 that are specified in LTE V2X.

In the following, an outline of transmission modes defined by NR V2X is described with reference to FIG. 8A to FIG. 8D.

Figure 8A:
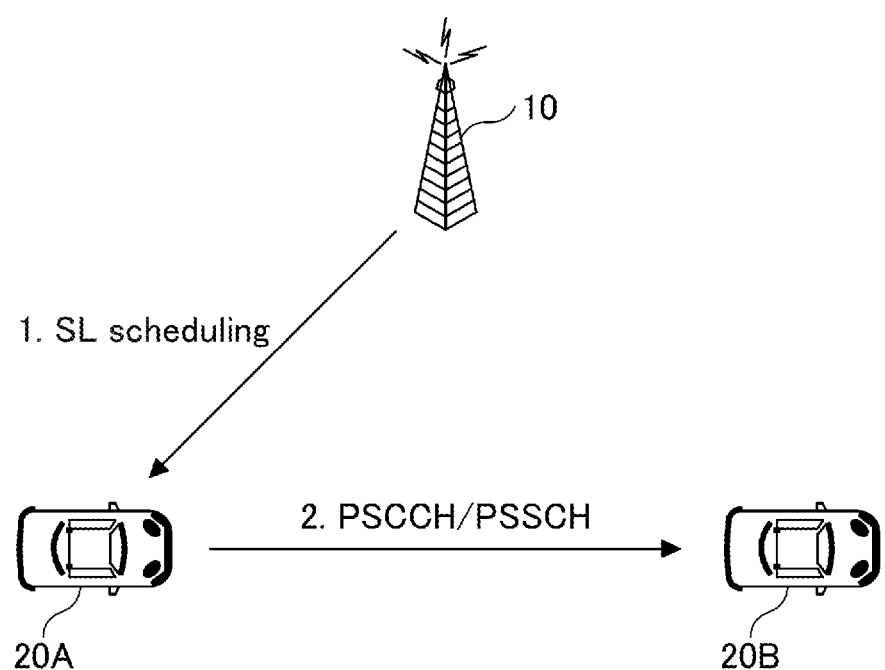
FIG. 8A is a diagram illustrating an outline of SL transmission mode 1 specified in NR V2X.

FIG. 8A is a diagram illustrating an overview of SL transmission mode 1 specified in NR V2X. SL transmission mode 1 specified in NR V2X corresponds to SL transmission mode 3 specified in LTE V2X. In the SL transmission mode 1 specified in NR V2X, the base station 10 schedules a transmission resource and assigns the transmission resource to the transmitting communication apparatus 20A. The communication apparatus 20A transmits a signal to the receiving communication apparatus 20B by using the assigned transmission resource.

Figure 8B:
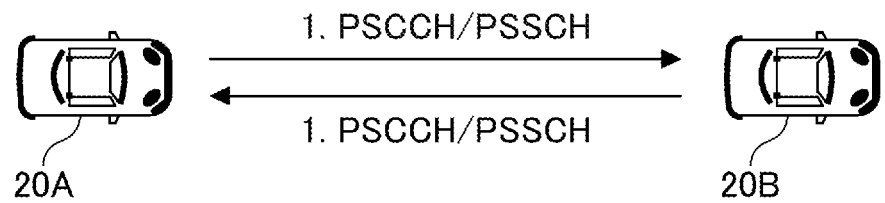
Figure 8C:
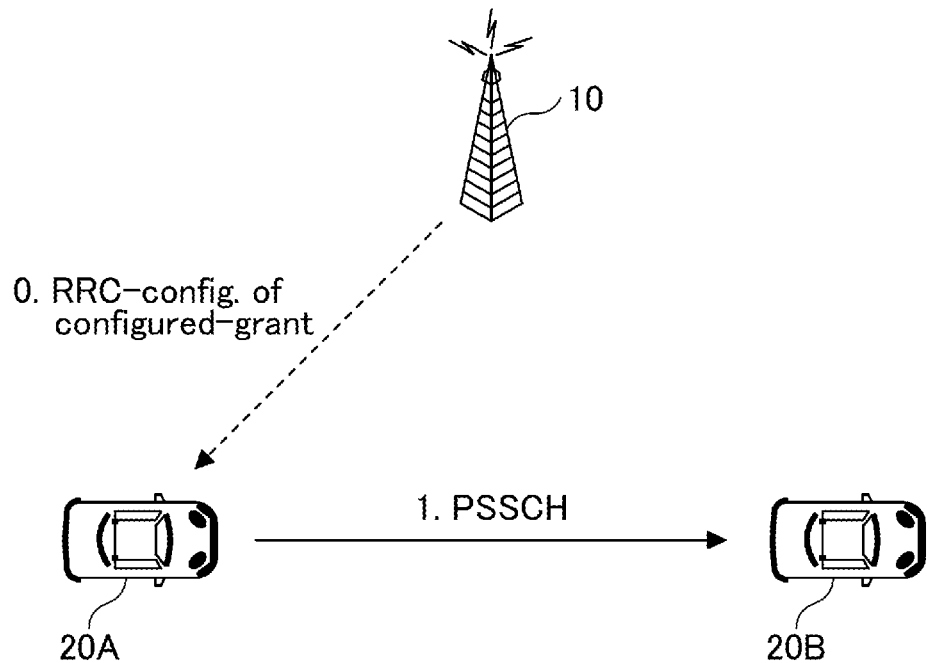
FIG. 8C is a diagram illustrating an outline of SL transmission mode 2c.
Figure 8D:
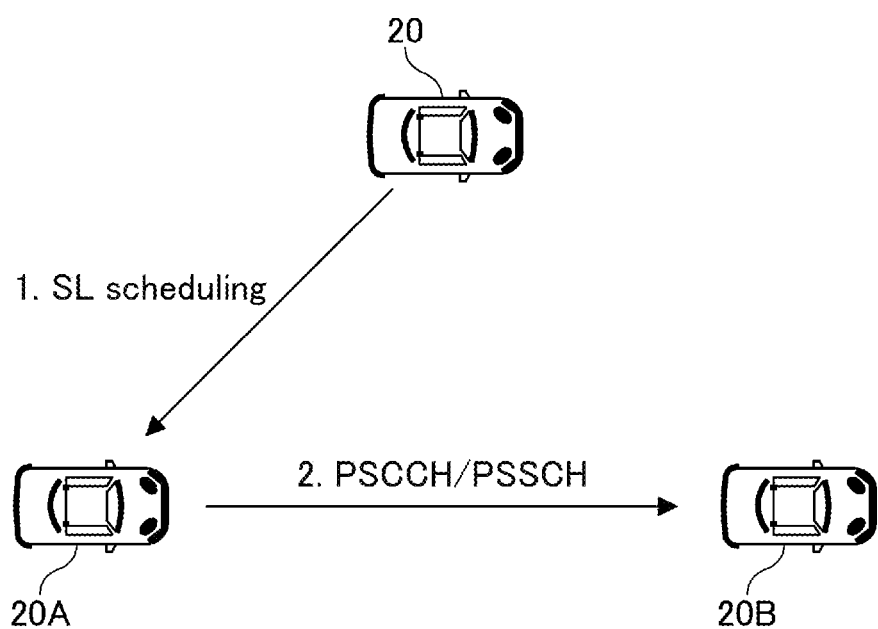
FIG. 8D is a diagram illustrating an outline of SL transmission mode 2d.

FIG. 8B, FIG. 8C, and FIG. 8D are diagrams illustrating an overview of SL transmission mode 2 as specified in NR V2X. SL transmission mode 2 specified in NR V2X corresponds to SL transmission mode 4 specified in LTE V2X.

FIG. 8B is a diagram illustrating an overview of SL transmission mode 2a. In SL transmission mode 2a, for example, the transmitting communication apparatus 20A autonomously selects a transmission resource and transmits a signal to the receiving communication apparatus 20B by using the selected transmission resource.

FIG. 8C is a diagram illustrating an outline of SL transmission mode 2c. In the SL transmission mode 2c, for example, the base station 10 preconfigures transmitting resources with a certain period to the communication apparatus 20A, and the communication apparatus 20A transmits a signal to the receiving communication apparatus 20B by using the transmitting resources with the predetermined period. Here, instead of the base station 10 preconfiguring the transmitting resources with the certain period to the communication apparatus 20A, for example, the transmitting resources with the certain period may be configured to the communication apparatus 20A according to a specification.

FIG. 8D is a diagram illustrating an overview of SL transmission mode 2d. In SL transmission mode 2d, for example, the communication apparatus 20 performs an operation that is the same as an operation of the base station 10. Specifically, the communication apparatus 20 schedules transmission resources and assigns the transmission resources to the transmitting communication apparatus 20A. The communication apparatus 20A may perform a transmission to a receiving communication apparatus 20B by using the assigned communication resources. Namely, the communication apparatus 20 may control a transmission by another communication apparatus 20.

Figure 9A:
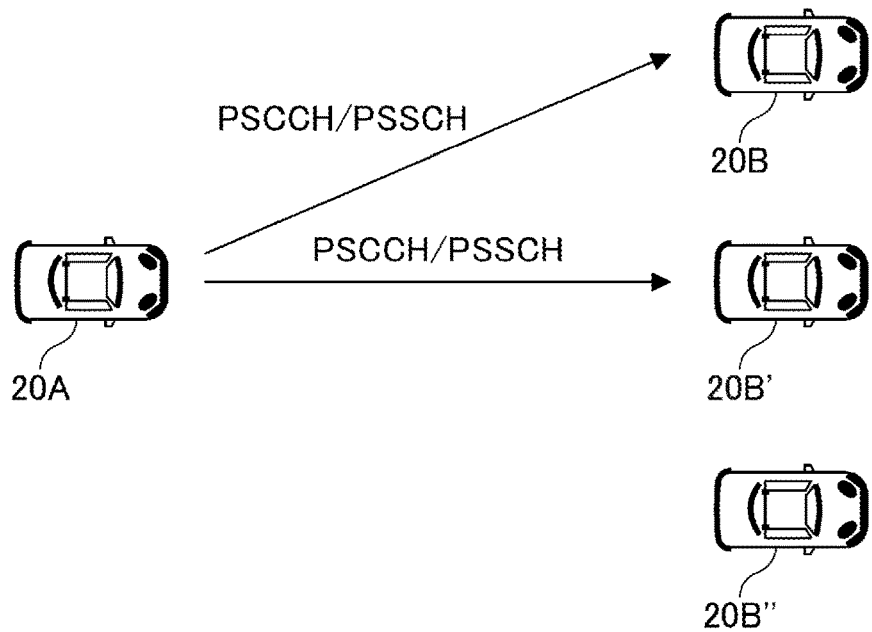
FIG. 9A is a diagram illustrating an example of a unicast PSCCH/PSSCH transmission.
Figure 9B:
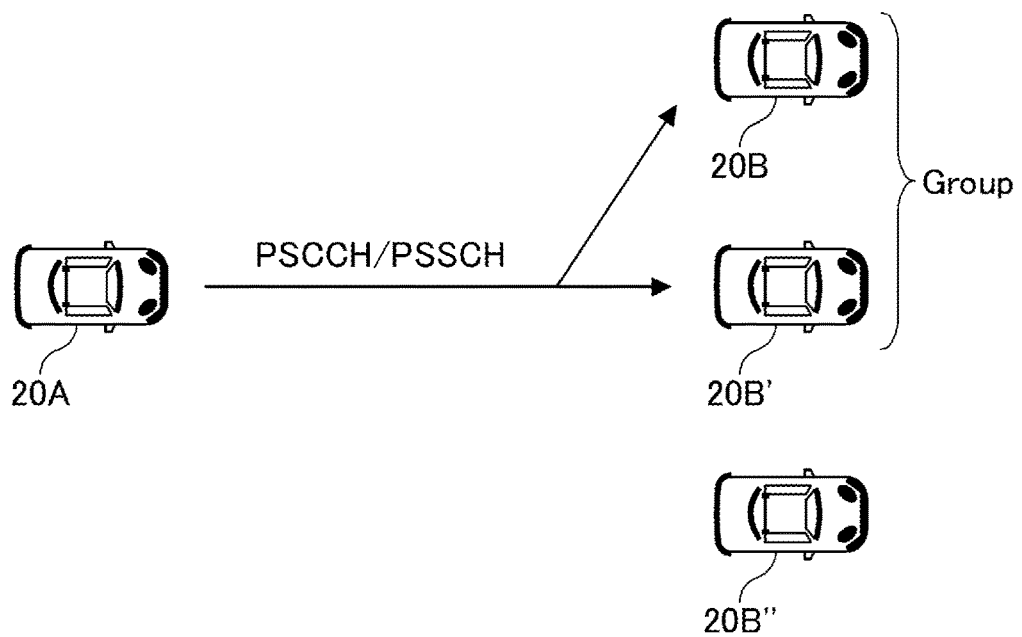
FIG. 9B is a diagram illustrating an example of a groupcast PSCCH/PSSCH transmission.
Figure 9C:
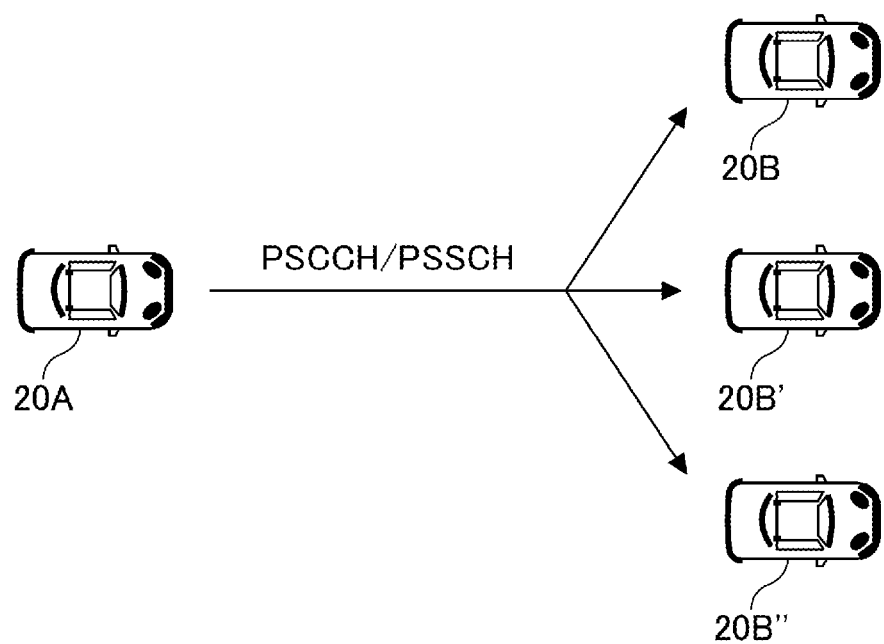
FIG. 9C is a diagram illustrating an example of a broadcast PSCCH/PSSCH transmission.

In the NR, as illustrated in FIG. 9A through FIG. 9C, three communication types, which are unicast, groupcast, and broadcast, are currently studied, as types of communication.

FIG. 9A is a diagram illustrating an example of unicast Physical Sidelink Shared Channel (PSCCH)/Physical Sidelink Control Channel (PSSCH) transmission. Unicast refers, for example, to a one-to-one transmission from the transmitting communication apparatus 20A to the receiving communication apparatus 20B.

FIG. 9B is a diagram illustrating an example of groupcast PSCCH/PSSCH transmission. A groupcast, for example, refers to a transmission from the transmitting communication apparatus 20A to the communication apparatus 20B and a receiving communication apparatus 20B', which are a group of the receiving communication apparatuses 20.

FIG. 9C is a diagram illustrating an example of a broadcast PSCCH/PSSCH transmission. Broadcast refers, for example, to a transmission from the transmitting communication apparatus 20A to the communication apparatus 20B, the communication apparatus 20B', and a communication apparatus 20B" which are all the receiving communication apparatuses 20 within a predetermined range.

In unicast and groupcast of NR-V2X, feedback of Hybrid automatic repeat request (HARQ) is supported.

In HARQ processing, an HARQ process number (HPN: HARQ process number) and a New Data Indicator (NDI) are used for NR-Uu (an interface between a user equipment and a base station). The HPN and the NDI are also assumed to be used in the NR-V2X.

An overview of HARQ processing in the NR-Uu is described with reference to FIG. 10.

The HPN is a process number for parallelly processing the HARQ process. Note that the HPN may be replaced with an HARQ process ID. If the maximum HPN is one, the transmission-side transmits data through a Physical Downlink Shared Channel (PDSCH), the reception-side determines a reception error of data by receiving the data, and the reception-side transmits a feedback of a reception result to the transmission-side. In this case, if a content of the feedback is ACK (positive acknowledgement), subsequent data is transmitted. In this case, until data is successfully received, subsequent data cannot be transmitted, and for this reason, the latency in the radio section may increase. In order to avoid such latency, HPN for parallelly processing the HARQ process is used. The HPN represents a number indicating a HARQ process of a plurality of parallelly processed HARQ processes.

The NDI is used to indicate that the transmission-side receives an ACK and that data to be subsequently transmitted is not retransmission data. The NDI is a field of one bit, and in a case where the current state in the NDI has been changed (toggled) relative to the previous state, a scheduled transmission of data on PDSCH is the initial transmission. In a case where the NDI is not toggled, a scheduled transmission of data on PDSCH is a retransmission.

Figure 10:
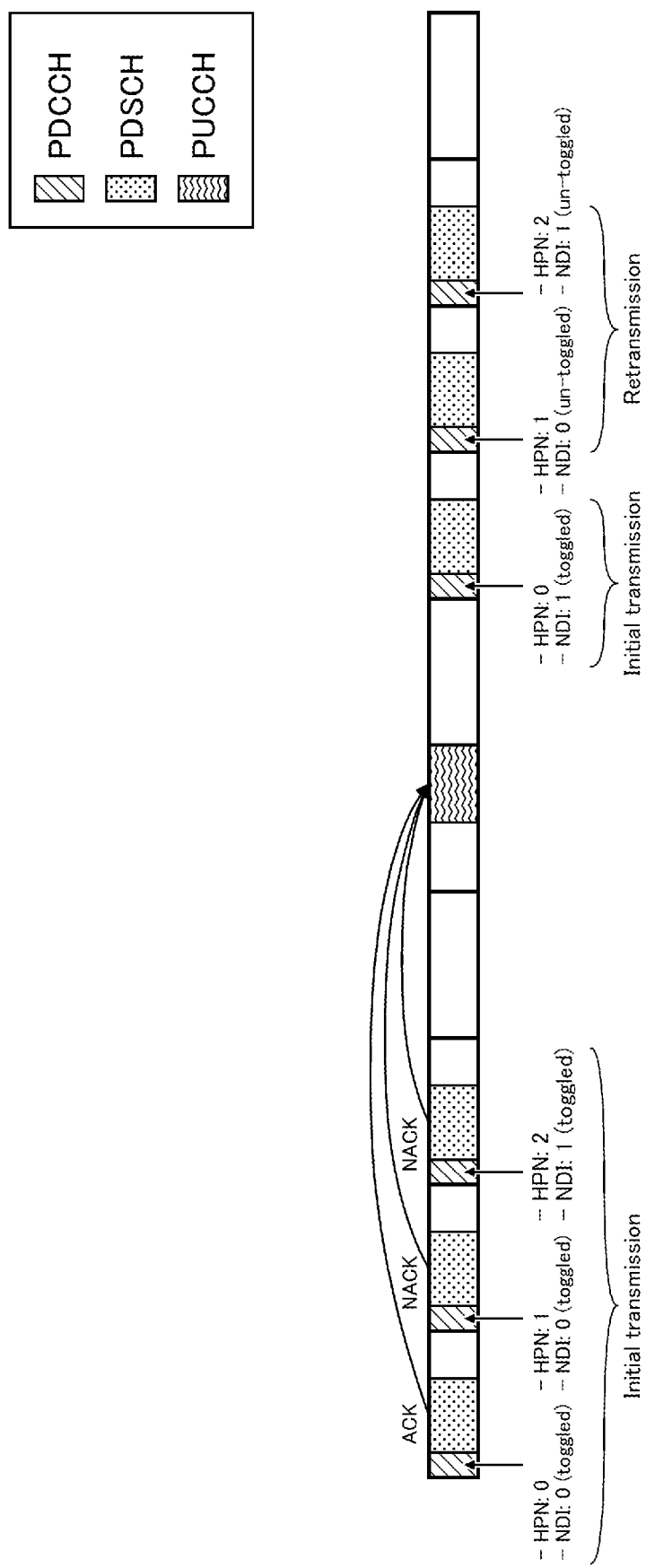
FIG. 10 is a diagram illustrating an example of HARQ processing of NR-Uu.

As illustrated in FIG. 10, for example, suppose that the NDI of the HPN0 is 0 and is toggled, the NDI of the HPN1 is 0 and is toggled, and the NDI of the HPN2 is 1 and is toggled. In this case, a transmission of data of HPN0 is the initial transmission of the data. A transmission of data of HPN1 is the initial transmission of data. A transmission of data of HPN2 is the initial transmission of data.

As illustrated in FIG. 10, in a case where the reception-side successfully receives data of HPN0, the reception-side transmits ACK to the transmission-side. As a result, the NDI of the HPN0 becomes 1. In other words, the NDI of the HPN0 is toggled. In a case where the reception-side has detected an error in reception of data of HPN1, the reception-side transmits NACK to the transmission-side. As a result, the NDI of the HPN1 becomes 0. In other words, the NDI of the HPN1 is not toggled. Furthermore, in a case where an error has been detected in reception of data of HPN2, the reception-side transmits NACK to the transmission-side. As a result, the NDI of the HPN2 becomes 1. In other words, the NDI of the HPN2 is not toggled. Accordingly, after the initial data is received, subsequent data is to be received in the HPN0. In each of the HPN1 and the HPN2, data to be retransmitted is to be received.

(Problem)

Subsequently, a problem is described that arises when processing that is the same as the HARQ processing of NR-Uu is performed for NR-V2X. In a case where HARQ processing of sidelink is performed in the NR-V2X, it is unknown whether the HPN and the NDI are to be shared for unicast and groupcast. Furthermore, it is unknown whether the HPN and the NDI are shared among transmitting communication apparatuses 20.

Figure 11:
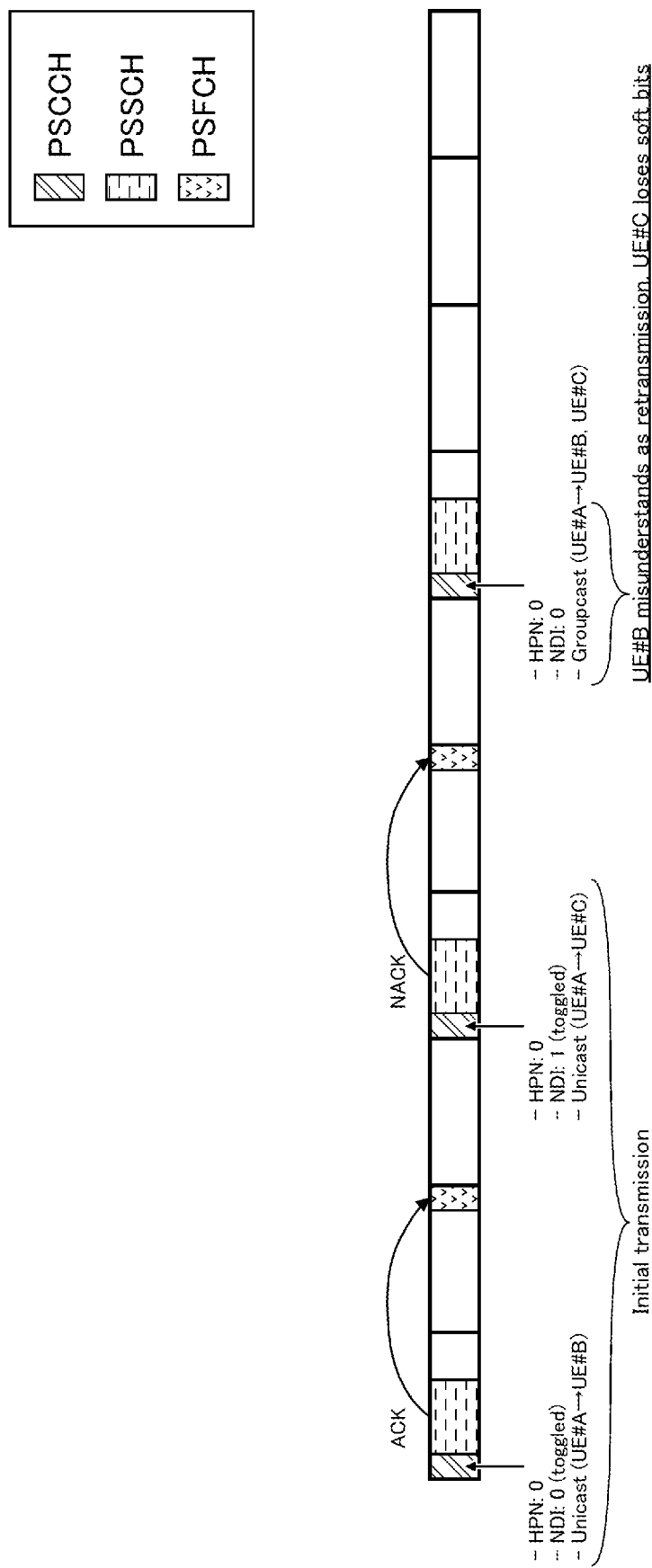
FIG. 11 is a diagram illustrating an example of a problem of HARQ processing in NR-V2X.

FIG. 11 is a diagram illustrating an example for describing the problem. In FIG. 11, it is assumed that the HPN and the NDI are shared for unicast and groupcast. First, in the HPN0, the NDI is toggled to 0, and a user equipment #A transmits data to a user equipment #B by unicast. Subsequently, the NDI is toggled to 1 in the HPN0, and the user equipment #A transmits data to a user equipment #C by unicast. In this case, if the NDI is set to 0 in the HPN0 and the user equipment #A transmits data to the user equipment #B and the user equipment #C by groupcast, the user equipment #B may incorrectly interpret that data is retransmitted, and the user equipment #C may incorrectly interpret that the transmission is the initial transmission of data and may inadvertently delete soft bits.

Figure 12:
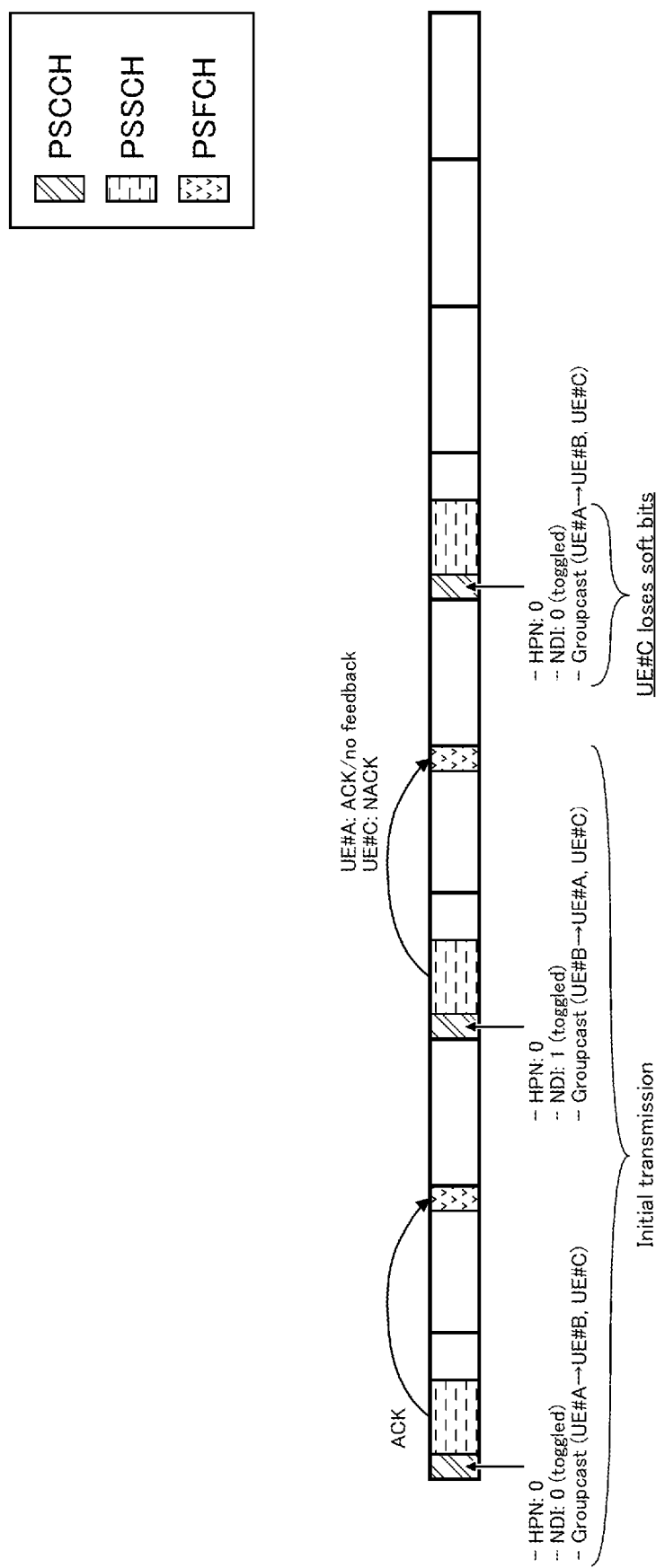
FIG. 12 is a diagram illustrating another example of a problem of HARQ processing in NR-V2X.

FIG. 12 is a diagram illustrating another example for describing the problem. In FIG. 12, it is assumed that the HPN and the NDI are shared among units of transmitting user equipment. First, in the HPN0, the NDI is toggled to 0, and the user equipment #A transmits data to the user equipment #B and the user equipment #C by groupcast. Subsequently, in the HPN0, the NDI is toggled, and the user equipment #B transmits data to the user equipment #A and the user equipment #C by groupcast. In this case, it is assumed that the user equipment #C has detected a reception error. Subsequently, in the HPN0, the NDI is toggled to 0, and the user equipment #A transmits data to the user equipment #B and the user equipment #C by groupcast. In this case, since the NDI is toggled, the user equipment #C inadvertently deletes old soft bits. Accordingly, even though the user equipment #C is to perform HARQ combining by receiving retransmission data, such an opportunity is lost due to the groupcast transmission from the user equipment A. Accordingly, the effect of HARQ processing may be unable to be obtained.

As a method for solving such a problem, a method is considered to define the HPN and the NDI, per terminal, per unicast, and per groupcast. However, in this case, the complexity in implementation of the user equipment may increase. Accordingly, it is necessary to obtain appropriate effects of HARQ processing while reducing the complexity in the implementation of the user equipment.

In the following, several methods applicable to NR-V2X sidelink HARQ processing are proposed.

(Method A)

In the solution method A, the HPN and the NDI are separately defined for the unicast and the groupcast.

Figure 13:
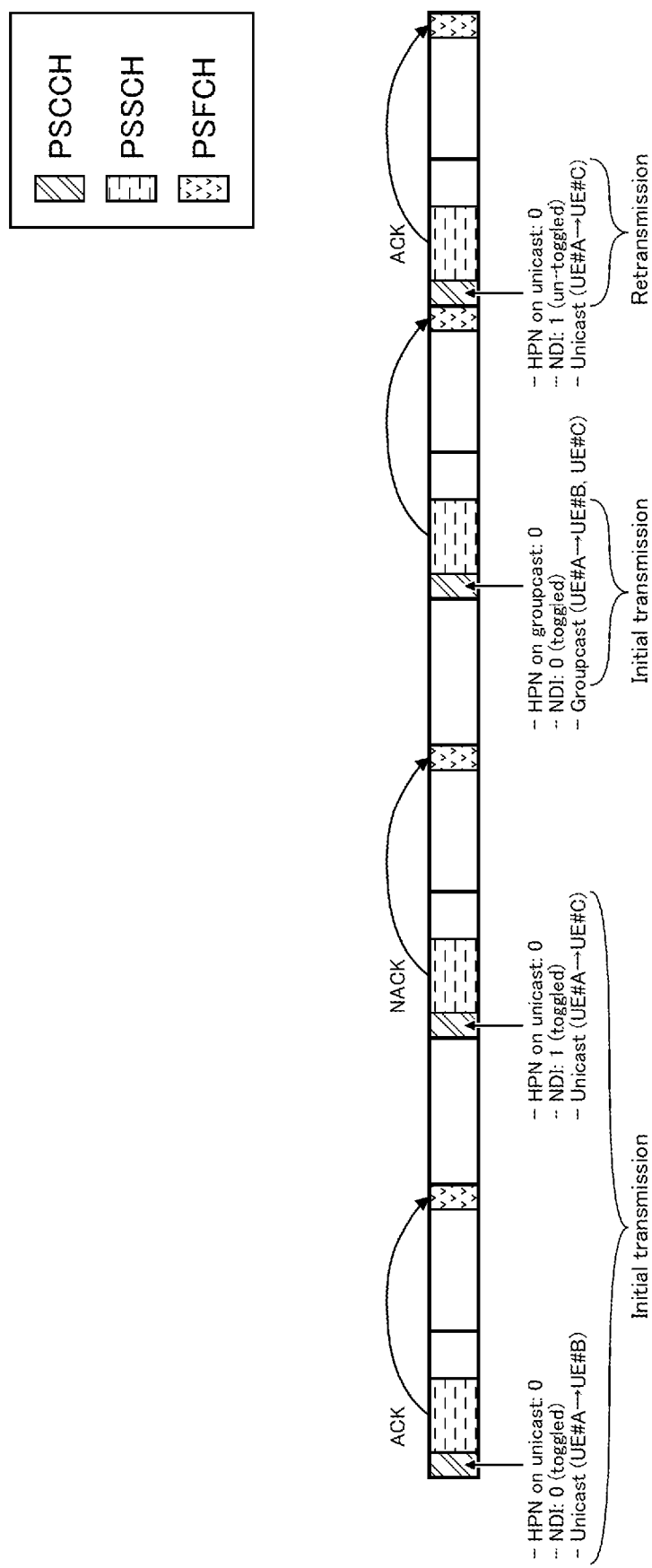
FIG. 13 is a diagram illustrating an example in which HPN and NDI are separately defined for unicast and groupcast.

FIG. 13 is a diagram illustrating an example in which the HPN and the NDI are separately defined for unicast and groupcast. As illustrated in FIG. 13, first, the NDI is toggled to 0 for the HPN0 for unicast, and the user equipment #A transmits data to the user equipment #B by unicast. Subsequently, the NDI is toggled to 1 for HPN0 for unicast, and the user equipment #A transmits data to the user equipment #C by unicast. In this case, it is assumed that the user equipment #C has detected a reception error. Subsequently, the NDI is toggled to 0 for the HPN0 for groupcast, and the user equipment #A transmits data to the user equipment #B and the user equipment #C by groupcast. Subsequently, the NDI is not toggled and kept as 1 for the HPN0 for unicast, and the user equipment #A retransmits data to the user equipment #C by unicast. In this manner, by independently defining the HPN and the NDI for groupcast and the HPN and the NDI for unicast, HARQ combining can be performed appropriately.

(A-1)

In A-1, the HPN and the NDI are independently defined for a plurality transmitting communication apparatuses 20, and further, for each transmitting communication apparatus 20, the HPN and the NDI may be defined separately for groupcast and for unicast.

(A-1-1)

The HPN and the NDI are defined as in A-1, and furthermore, the HPN and the NDI may be independently defined for a plurality of receiving apparatuses 20 (or a plurality of groups of receiving communication apparatuses 20) (i.e., per communication destination ID). In other words, the HPN and the NDI may be defined per link.

(A-1-2)

The HPN and the NDI may be common among a plurality of receiving communication apparatuses 20. According to the configuration of the above-described A-1, the HPN and the NDI are defined independently among the transmitting communication apparatuses 20, and furthermore, the HPN and the NDI are defined separately for groupcast and for unicast. Accordingly, the HARQ processing can be managed easily. However, the complexity in the implementation of the communication apparatus 20 may increase, e.g., many software buffers are to be reserved.

(A-2)

In A-2, the HPN and the NDI are separately defined for unicast and groupcast, but the HPN and the NDI are common among a plurality of transmitting communication apparatuses 20 (IDs of the plurality of transmitting communication apparatuses 20).

In a case where a receiving communication apparatus 20 received, in an HPN #A, PSCCH/PSSCH from a specific communication apparatus 20, and the receiving communication apparatus 20 had received, in the HPN #A, PSCCH/PSSCH from another communication apparatus 20 and detected a reception error, the following three options may be considered.

(A-2-1)

The receiving communication apparatus 20 may ignore PSCCH/PSSCH received later in time, except for the NDI.

(A-2-2)

The receiving communication apparatus 20 may decode PSCCH/PSSCH received later in time.

(A-2-3)

The receiving communication apparatus 20 may ignore PSCCH/PSSCH received later in time, except for the NDI, or may perform reception based on an order of priority levels specified in PSCCH.

According to this configuration, an increase in the complexity in the implementation of the communication apparatus 20, such as the number of software buffers, can be avoided.

(Method B)

The HPN and the NDI may be defined commonly for unicast and groupcast.

(B-1)

In a groupcast transmission and/or in a unicast transmission, the HPN and the NDI may be defined per transmitting communication apparatus 20.

Figure 14:
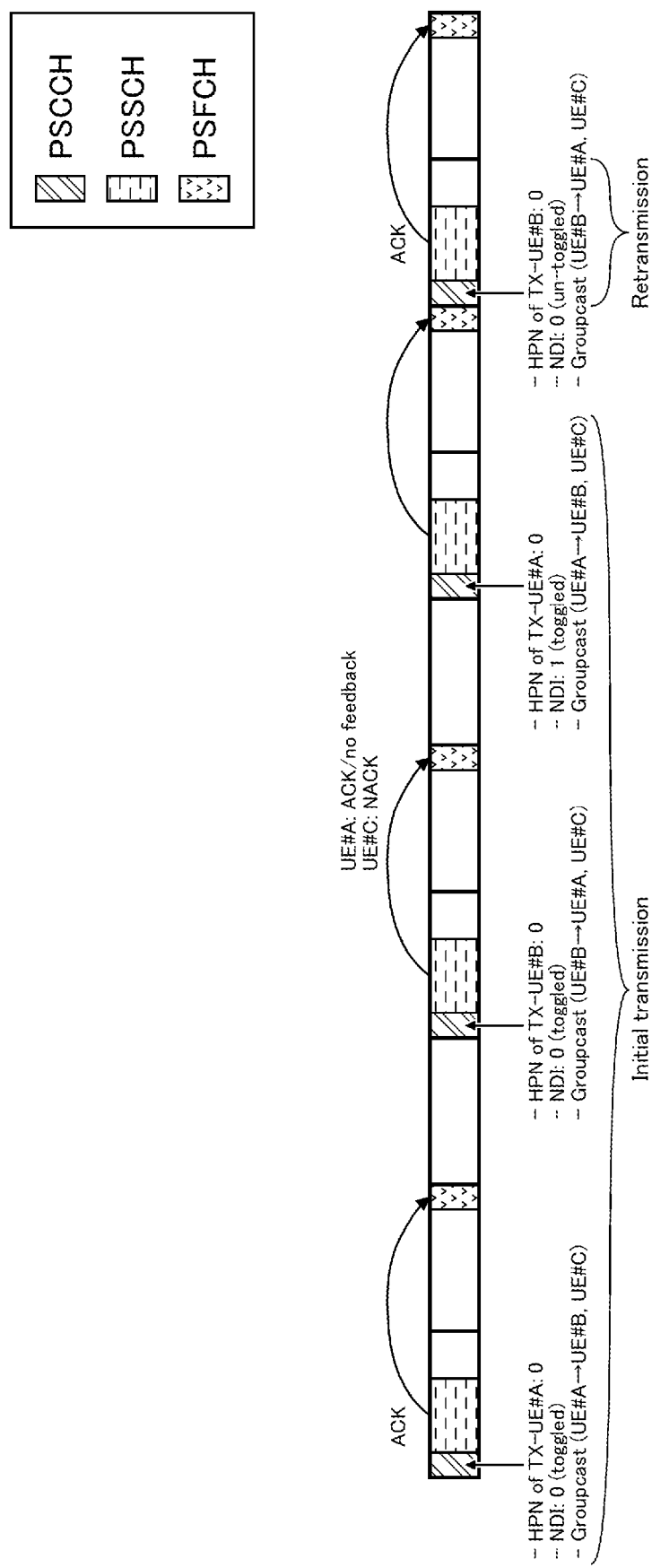
FIG. 14 is a diagram illustrating an example in which HPN/NDI are defined per transmitting communication apparatus.

FIG. 14 is a diagram illustrating an example in which, in a groupcast transmission and/or a unicast transmission, HPN/NDI are defined per transmitting communication apparatus 20. First, in the HPN0 of a transmitting user equipment #A, the NDI is toggled to 0, and the user equipment #A transmits data to the user equipment #B and the user equipment #C by groupcast. Subsequently, in the HPN0 of a transmitting user equipment #B, the NDI is toggled to 0, and the user equipment #B transmits data to the user equipment #A and the user equipment #C by groupcast. In this case, it is assumed that the user equipment #C has detected a reception error. Subsequently, in the HPN0 of the transmitting user equipment #A, the NDI is toggled to 1, and the user equipment #A transmits data to the user equipment #B and the user equipment #C by groupcast. Subsequently, in the HPN0 of the transmitting user equipment #B, the NDI is not toggled and kept as 0, and the user equipment #B retransmits data to the user equipment #A and the user equipment #C by groupcast.

As described above, by defining the HPN and the NDI per transmitting communication apparatus 20, HARQ combining can be performed appropriately.

(B-1-1)

Furthermore, the HPN and the NDI may be independently defined among a plurality of receiving communication apparatuses 20 (or a plurality of groups of receiving communication apparatuses 20) (i.e., per communication destination ID). In other words, the HPN and the NDI may be defined per link.

(B-1-2)

The HPN and the NDI may be common among a plurality of receiving communication apparatuses 20 (a plurality of groups of receiving communication apparatuses 20).

In a case where a receiving communication apparatus 20 receives, in an HPN #A, PSCCH/PSSCH from a specific communication apparatus 20, and the receiving communication apparatus 20 had received, in HPN #A, PSCCH/PSSCH from the same or another communication apparatus 20 and detected a reception error, the following four options may be considered.

(B-1-1)

The receiving communication apparatus 20 may ignore PSCCH/PSSCH received later in time, except for the NDI.

(B-1-2)

The receiving communication apparatus 20 may decode PSCCH/PSSCH received later in time.

(B-1-3)

The receiving communication apparatus 20 may ignore PSCCH/PSSCH received later in time, except for the NDI, or may perform reception based on an order of priority levels specified in PSCCH.

(B-1-4)

The receiving communication apparatus 20 may ignore PSCCH/PSSCH received later in time, except for the NDI, or may perform reception in accordance with whether each PSSCH is unicast or groupcast.

According to the above-described configuration, the HARQ processing can be managed easily.

(B-2)

Furthermore, in a groupcast transmission and/or a unicast transmission, the HPN and the NDI may be commonly defined per transmitting communication apparatus 20.

FIG. 15 is a diagram illustrating an example of a case where the HPN and the NDI are defined separately for unicast and for groupcast in the above-described A-1. Different HPNs are defined for unicast and groupcast.

Figure 16:
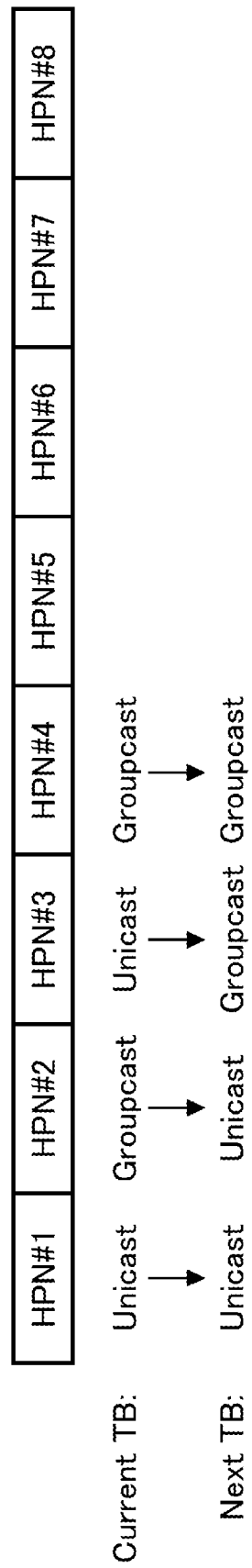
FIG. 16 is a diagram illustrating an example of a case in which HPN and NDI are commonly defined for unicast and groupcast.

FIG. 16 is a diagram illustrating an example in which the HPN and the NDI are commonly defined for unicast and groupcast in the above-described method B. Since the HPN and the NDI are commonly defined for unicast and groupcast, in a case where, in each HPN, for example, the current transmission block (TB) is that of groupcast, a subsequent TB is assumed to be that of unicast.

FIG. 17 is a drawing illustrating an example of the above-described A-1-1. A-1-1 is a case where the HPN and the NDI are defined separately among a plurality of transmitting communication apparatuses 20, the HPN and the NDI are defined separately among a plurality of receiving communication apparatuses 20, and the HPN and the NDI are defined separately for unicast and for groupcast. This is equivalent to defining the HPN and the NDI per link. For example, the uppermost HARQ process in FIG. 17 illustrates a set of HARQ processes in a case where unicast transmissions are performed from a transmitting user equipment to the receiving user equipment #1 by unicast. In this manner, for the same transmitting user equipment, a set of HARQ processes is defined separately for a case of unicast and for a case of groupcast, per communication destination. Such a set of HARQ processes is defined per transmitting user equipment.

(Method C)

In the method C, a case where groupcast is performed is assumed. In a case where a new communication apparatus 20 joins a group, it is assumed that the new communication apparatus 20 does not recognize the current HPN and the current NDI. For the operation of the communication apparatus 20 in this case, the following options may be considered.

(C-1)

It may be assumed that, for the communication apparatus 20 that has newly joined the group, an initial transmission is scheduled by a PSCCH received for a first time in an HPN, regardless of the value of the NDI.

(C-2)

The communication apparatus 20 that has newly joined the group may receive the current HPN and the current NDI from a gNB or a communication apparatus 20 in the group.

(C-3)

In a case where a new communication apparatus 20 joins the group, all communication apparatuses 20 in the group may reset the HPN and the NDI.

(Method D)

In the method D, the maximum HARQ process number is set to one, and NDIs are separately defined for unicast and groupcast. Furthermore, the NDI alone may be defined per transmitting communication apparatus 20.

(Method E)

An upper limit may be set for the total number of HPNs. Each communication apparatus 20 may count the number of HPNs in operation. In this case, if the number of counted HPNs exceeds the upper limit of the total number of HPNs, the communication apparatus 20 may ignore the PSCCH/PSSCH corresponding to the HPNs exceeding the upper limit number, or may transmit NACK as a feedback without decoding.

It has been studied to stop (disable) the HARQ-ACK feedback function. In a case where the HARQ-ACK feedback function is stopped, the field of the HPN and the field of the NDI may be empty (for example, zero or not including any bit), or may be ignored by the receiving communication apparatus 20. Conversely, by setting the field of HPN and the field of NDI to be empty (for example, zero or not including any bit), it may be indicated that the HARQ-ACK feedback function is stopped.

In the above-described embodiments, various options have been considered as to whether the HPN and the NDI are common for unicast and groupcast, as to whether the HPN and the NDI are common among a plurality of transmitting communication apparatuses 20, and as to whether the HPN and the NDI are common among a plurality of receiving communication apparatuses 20. However, embodiments are not limited to the above-described embodiments, and for example, separate options may be applied to the HPN and the NDI. According to such configuration, the HARQ processing can be easily managed, and the complexity on software buffers in user equipments can be reduced. In order to achieve this effect, at least one of the following rules may be applied.

If sidelink control information (SCI) including an HPN is transmitted or received while an NDI is toggled, the communication apparatus 20 deletes data transmitted/received before, which is associated with the HPN.

If sidelink control information (SCI) including an HPN is transmitted/received while an NDI is toggled, the communication apparatus 20 deletes data in a software buffer, which is associated with the HPN.

The communication apparatus 20 holds at most one set of soft bits for an HPN.

(Device Configuration)

Next, a functional configuration example of each of the base station 10 and the communication apparatus 20 that execute the processes and the operation described so far is described.

<Base Station 10>

Figure 18:
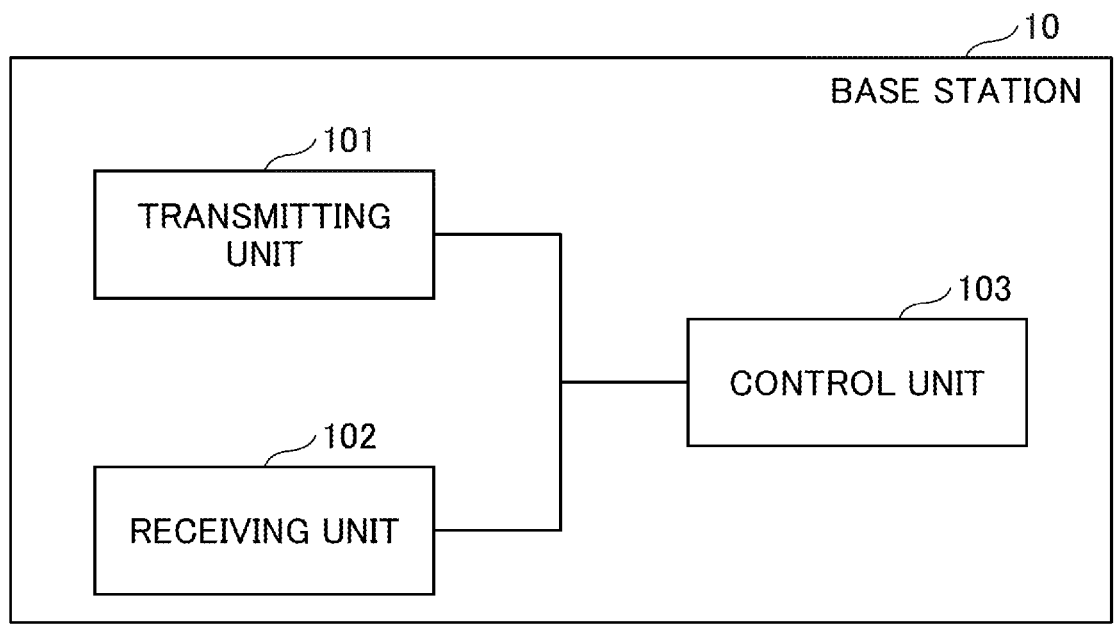
FIG. 18 is a diagram illustrating an example of a functional configuration of a base station according to an embodiment.

FIG. 18 is a diagram illustrating an example of a functional configuration of the base station 10. As illustrated in FIG. 18, the base station 10 includes a transmitting unit 101, a receiving unit 102, and a control unit 103. The functional configuration illustrated in FIG. 18 is only an example. As long as the operation according to the embodiments can be executed, the functional division and the name of the functional unit may be any division and name. Furthermore, the transmitting unit 101 may be referred to as a transmitter, and the receiving unit 102 may be referred to as a receiver.

The transmitting unit 101 has a function of generating a signal to be transmitted to the communication apparatus 20 side and transmitting the signal wirelessly. The receiving unit 102 has a function of receiving various types signals transmitted from the communication apparatus 20 and acquiring, for example, information of an upper layer from the received signals. Furthermore, the receiving unit 102 has a function of measuring the received signal and acquiring a quality value.

The control unit 103 controls the base station 10. The function of the control unit 103 related to transmission may be included in the transmitting unit 101, and the function of the control unit 103 related to reception may be included in the receiving unit 102.

<Communication Apparatus 20>

Figure 19:
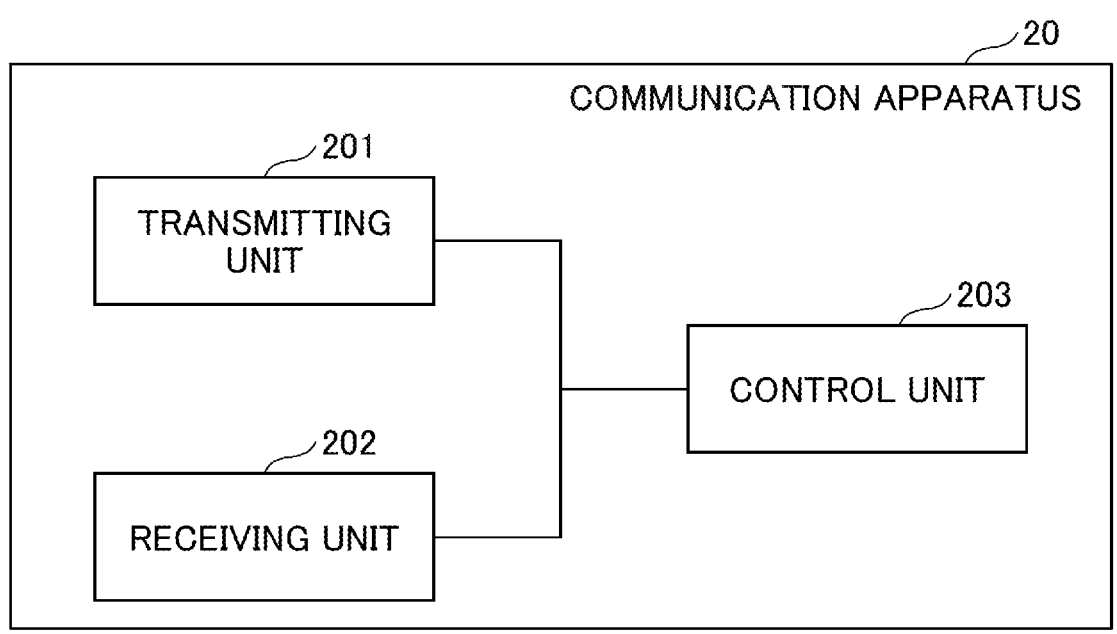
FIG. 19 is a diagram illustrating an example of a functional configuration of a communication apparatus according to an embodiment.

FIG. 19 is a diagram illustrating an example of a functional configuration of the communication apparatus 20. As illustrated in FIG. 19, the communication apparatus 20 includes a transmitting unit 201, a receiving unit 202, and a control unit 203. The functional configuration illustrated in FIG. 19 is only an example. As long as the operation according to the embodiments can be executed, the functional division and the name of the functional unit nay be any division and name. Furthermore, the transmitting unit 201 may be referred to as a transmitter, and the receiving unit 202 may be referred to as a receiver. Furthermore, the communication apparatus 20 may be the communication apparatus 20A on the transmission side or the communication apparatus 20B on the reception side. Furthermore, the communication apparatus 20 may be a scheduling communication apparatus 20.

The transmitting unit 201 generates a transmission signal from transmission data and transmits the transmission signal wirelessly. The receiving unit 202 wirelessly receives various types of signals, and acquires a signal of an upper layer from the received signal of the physical layer. Furthermore, the receiving unit 202 has a function of measuring the received signal and acquiring a quality value.

The control unit 203 controls the communication apparatus 20. Note that, the function of the control unit 203 related to transmission may be included in the transmitting unit 201, and the function of the control unit 203 related to reception may be included in the receiving unit 202.

Furthermore, the control unit 203 performs sidelink HARQ processing. In the transmitting communication apparatus 20, the control unit 203 generates sidelink control information including the HPN and the NDI, and the transmitting unit 201 transmits the sidelink control information including the HPN and the NDI to the receiving communication apparatus 20. The control unit 203 may separately define the HPN and the NDI for unicast and groupcast. Furthermore, the control unit 203 may independently define the HPN and the NDI for a plurality of transmitting communication apparatuses 20, and further, may define, for each transmitting communication apparatus 20, the HPN and the NDI separately for groupcast and unicast. Furthermore, the control unit 203 may define the HPN and the NDI independently for a plurality of receiving communication apparatuses 20 (or a plurality of groups of receiving communication apparatuses 20).

Furthermore, the control unit 203 may define the HPN and the NDI commonly for unicast and groupcast. In a groupcast transmission and/or a unicast transmission, the control unit 203 may define the HPN and the NDI per transmitting communication apparatus 20. Furthermore, the control unit 203 may define the HPN and the NDI independently for a plurality of receiving communication apparatuses 20 (or a plurality of groups of receiving communication apparatuses 20).

<Hardware Configuration>

The block diagrams (FIG. 18 through FIG. 19) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 20:
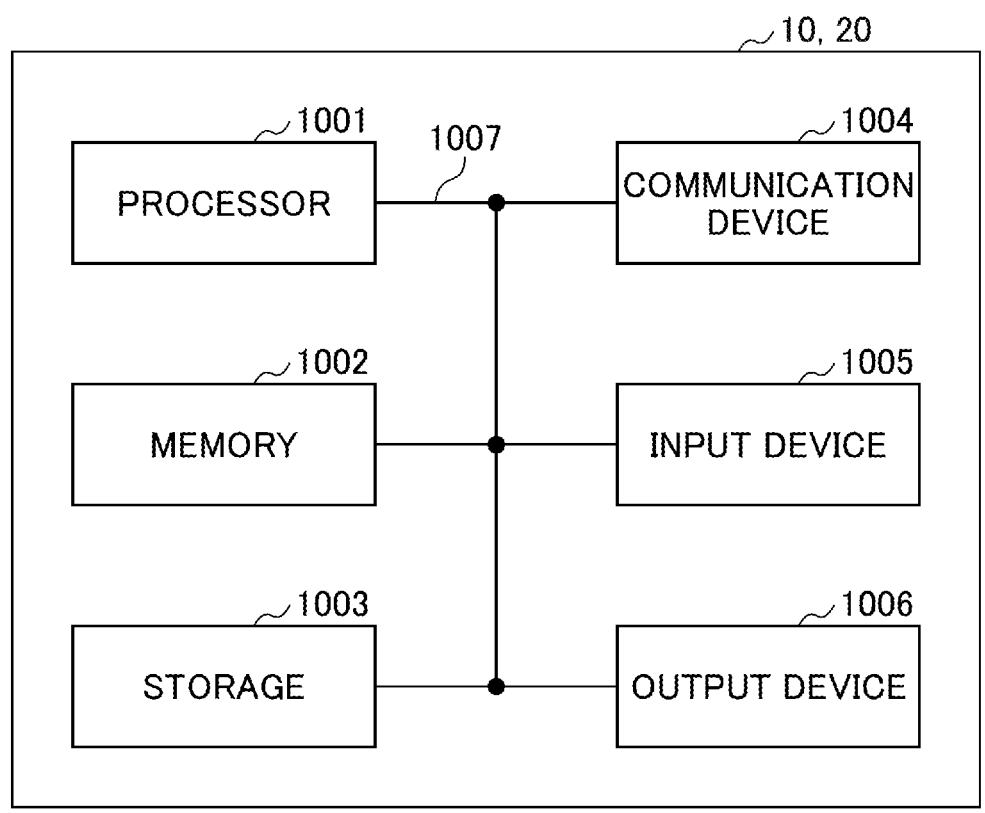
FIG. 20 is a diagram illustrating an example of a hardware configuration of the base station and the communication apparatus according to an embodiment.

For example, the communication apparatus 20 and the base station 10 in an embodiment of the present invention may function as a computer for performing a process of the embodiments. FIG. 20 is a diagram illustrating an example of a hardware configuration of the communication apparatus 20 and the base station 10 according to an embodiment. Each of the communication apparatus 20 and the base station 10 described above may be physically configured as a computer device including a processor 1001, a memory 1002, a storage 1003, a communication device 1004, an input device 1005, an output device 1006, a bus 1007, and the like.

In the following description, the term "device" can be replaced with a circuit, device, unit, or the like. The hardware configuration of each of the communication apparatus 20 and the base station 10 may be configured to include one or more of devices represented by 1001 through 1006, which are depicted, or may be configured without including some devices.

Each function in each of the communication apparatus 20 and the base station 10 is implemented such that predetermined software (program) is read on hardware such as the processor 1001, the memory 1002 and the like, and the processor 1001 performs an operation and controls communication by the communication device 1004 and at least one of reading and writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, data, or the like from at least one of the storage 1003 and the communication device 1004 out to the memory 1002, and executes various types of processes according to them. A program causing a computer to execute at least some of the operations described in the above embodiments is used as the program. For example, the control unit 203 of the communication apparatus 20 may be implemented by a control program which is stored in the memory 1002 and operates on the processor 1001, and another functional block may be implemented similarly. Various types of processes are described to be executed by one processor 1001 but may be executed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 may also be referred to as a "register," a "cache," a "main memory," or the like. The memory 1002 can store programs (program codes), software modules, or the like which are executable for carrying out the radio communication method according to an embodiment of the present disclosure.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 may be referred to as an auxiliary storage device. The above-described storage medium may be, for example, a database, a server, or any other appropriate medium including at least one of the memory 1002 and the storage 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD).

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the memory 1002 are connected by the bus 1007 to communicate information with each other. The bus 1007 may be configured with a single bus or may be configured with different buses between the devices.

Furthermore, each of the communication apparatus 20 and the base station 10 may be configured to include hardware such as a microprocessor, a digital signal processor (DSP: Digital Signal Processor), an application specific integrated circuit (ASIC), a programmable logic device (PLD), or a field programmable gate array (FPGA), or all or some of the functional blocks may be implemented by the hardware. For example, the processor 1001 may be implemented by at least one of these hardware components.

Conclusion of the Embodiments

In this specification, at least a communication apparatus and a communication method described below are disclosed.

A communication apparatus including a control unit that separately defines, for unicast and for groupcast, a Hybrid Automatic Repeat Request (HARQ) process number and a New Data Indicator (NDI) used for sidelink HARQ processing; and a transmitting unit that transmits sidelink control information including the HARQ process number and the NDI defined for the unicast, or including the HARQ process number and the NDI defined for the groupcast.

According to the above-described configuration, by independently defining the HPN and the NDI for groupcast and the HPN and the NDI for unicast, HARQ combining can be performed appropriately.

When the sidelink control information is to be transmitted by the unicast, the transmitting unit may transmit the sidelink control information including the HARQ process number and the NDI defined for the unicast.

When the sidelink control information is to be transmitted by the groupcast, the transmitting unit may transmit the sidelink control information including the HARQ process number and the NDI defined for the groupcast.

The control unit may separately define the HARQ process number and the NDI for a plurality of communication apparatuses, and the control unit may separately define, for the groupcast and the unicast, the HARQ process number and the NDI for each communication apparatus of the plurality of communication apparatuses.

A communication method executed by a communication apparatus, the method including separately defining, for unicast and for groupcast, a Hybrid Automatic Repeat Request (HARQ) process number and a New Data Indicator (NDI) used for sidelink HARQ processing; and transmitting sidelink control information including the HARQ process number and the NDI defined for the unicast, or including the HARQ process number and the NDI defined for the groupcast.

According to the above-described configuration, by independently defining the HPN and the NDI for groupcast and the HPN and the NDI for unicast, HARQ combining can be performed appropriately.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the communication apparatus 20 and the base station 10 are described using the functional block diagrams, but such devices may be implemented by hardware, software, or a combination thereof. Software executed by the processor included in the communication apparatus 20 according to the embodiments of the present invention and software executed by the processor included in the base station 10 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX(registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in the present disclosure may be reversed in order provided that there is no contradiction. For example, the method described in the present disclosure presents elements of various steps with an exemplary order and is not limited to a presented specific order.

In the present disclosure, a specific operation to be performed by the base station 10 may be performed by an upper node in some cases. In the network including one or more network nodes including the base station 10, various operations performed for communication with the terminal can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be performed in accordance with a value (0 or 1) indicated by one bit, may be performed in accordance with a Boolean value (Boolean: true or false), or may be performed by a comparison of numerical values (for example, a comparison with a predetermined value).

Each aspect/embodiment described in the present disclosure may be used alone, in combination, or may be switched in accordance with the execution. Further, notification of predetermined information (for example, notification of "being X") is not limited to being performed explicitly, but may be performed implicitly (for example, not notifying the predetermined information).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message.

The terms "system" and "network" used in the present disclosure are used interchangeably. Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS: Base Station)," "radio base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," "communication apparatus" and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication apparatus, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication apparatus, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of terminals (for example, which may be referred to as device-to-device (D2D) or vehicle-to-everything (V2X)). In this case, the user terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station 10 may have the functions of the above-mentioned user terminal 20.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

In a case in which "include," "including," and variations thereof are used in the present disclosure, these terms are intended to be comprehensive, similar to a term "provided with (comprising)." Further, the term "or" used in the present disclosure is intended not to be an exclusive OR.

In the present disclosure, for example, when an article such as "a," "an," or "the" in English is added by a translation, the present disclosure may include a case in which a noun following the article is plural.

In the present disclosure, a term "A and B are different" may mean "A and B are different from each other." Furthermore, the term may mean "each of A and B is different from C." Terms such as "separated," "coupled," or the like may also be interpreted similarly to "different."

Although the present invention is described above in detail, it is obvious to those skilled in the art that the present invention is not limited to the embodiments described in the specification. The present invention may be implemented as revised and modified embodiments without departing from the gist and scope of the present invention as set forth in claims. Accordingly, the description of the specification is for the purpose of illustration and does not have any restrictive meaning to the present invention.

LIST OF REFERENCE SYMBOLS 10 base station
20 communication apparatus
101 transmitting unit
102 receiving unit
103 configuration information management unit
104 control unit
201 transmitting unit
202 receiving unit
203 configuration information management unit
204 control unit
1001 processor 1002 memory
1003 storage
1004 communication device
1005 input device
1006 output device

The invention claimed is:

1. A terminal comprising:
a controller that independently configures, for unicast and for groupcast, a Hybrid Automatic Repeat Request (HARQ) process number and a new data indicator used for HARQ processing for inter-terminal communication, wherein the controller separately configures for each combination of an identifier of a transmitting side of data and a receiving side of the data, the HARQ process number and the new data indicator used for the HARQ process for the inter-terminal communication; and
a transmitter that transmits control information for the inter-terminal communication, the control information including the HARQ process number and the new data indicator.

2. The terminal according to claim 1,
wherein the controller controls so that the NDI is toggled for an initial transmission of data and the NDI is not toggled for a retransmission of the data, and
wherein the transmitter performs the initial transmission of the data or the retransmission of the data based on the new data indicator.

3. The terminal according to claim 2, wherein, when the controller disables a feedback function in the HARQ-ACK process, the controller sets information indicating that the feedback function is disabled.

4. The terminal according to claim 1, wherein, when the controller disables a feedback function in the HARQ-ACK process, the controller sets information indicating that the feedback function is disabled.

5. A communication system comprising:
a first terminal;
a second terminal,
wherein the first terminal includes
a controller that independently configures, for unicast and groupcast, a HARQ process number and a new data indicator used for a Hybrid Automatic Repeat Request (HARQ) process for inter-terminal communication, wherein the controller separately configures, for each combination of an identifier of a transmitting side of data and a receiving side of the data, the HARQ process number and the new data indicator used for the HARQ process for the inter-terminal communication; and
a transmitter that transmits, to the second terminal, control information for the inter-terminal communication, the control information including the HARQ process number and the new data indicator,
wherein the second terminal includes
a receiver that receives, from the first terminal, the control information for the inter-terminal communication.

6. A communication method executed by a terminal, the method comprising:
independently configuring, for unicast and for groupcast, a Hybrid Automatic Repeat Request (HARQ) process number and a new data indicator used for HARQ processing for inter-terminal communication and separately configuring, for each combination of an identifier of a transmitting side of data and a receiving side of the data, the HARQ process number and the new data indicator used for the HARQ process for the inter-terminal communication; and
transmitting control information for the inter-terminal communication, the control information including the HARQ process number and the new data indicator.

* * * * *